United States Patent Office 3,438,933
Patented Apr. 15, 1969

3,438,933
MOLDING PROCESS AND COMPOSITION
James R. Bartsch, Lebanon, N.J., assignor to PCR Patent Development Corporation, Princeton, N.J., a corporation of New Jersey
No Drawing. Continuation-in-part of application Ser. No. 252,058, Jan. 28, 1963. This application Dec. 5, 1966, Ser. No. 598,911
Int. Cl. C08f 15/18, 47/12; A63b 37/00
U.S. Cl. 260—41.5                                    7 Claims

ABSTRACT OF THE DISCLOSURE

The molding of bodies, such as golf balls, from a diene elastomer, such as cis butadiene rubber containing a relatively large quantity, such as about 25–90% by weight of a cross-linking monomer, such as butylene glycol dimethacrylate or divinyl benzene under the influence of a free radical initiator, such as a peroxide catalyst preferably under the influence of heat.

CROSS REFERENCE TO RELATED APPLICATIONS

This application is a continuation-in-part of application Ser. No. 252,588, filed Jan. 28, 1963, now abandoned, and of application Ser. No. 308,360, filed Sept. 12, 1963 now U.S. Patent No. 3,313,545, issued Apr. 11, 1967.

BACKGROUND OF THE INVENTION

Golf balls have evolved from their early form which simply consisted of a stuffed cover, to a highly sophisticated article which must have very many precise characteristics in order to satisfy players and be acceptable for tournament use. The only golf balls which have thus far been found acceptable for these purposes are wound balls which are made by winding a tensioned rubber thread about a suitable core, covering the wound article with a tough cover, such as of gutta-percha compounds or the like and finally painting the covered ball.

In order to comply with the rules of the game, as for example, as set forth by the United States Golf Association (U.S.G.A.), golf balls must be greater than 1.680" in diameter, must weigh less than 1.620 ounces and cannot have an initial velocity of more than 255 feet per second as measured on a standard U.S.G.A. golf ball testing machine. In addition to these required characteristics, the balls must be as near to round as possible, and retain this roundness even after use, must be well balanced so that they fly and roll true and make a good sharp sound when struck by the golf club, generally referred to as "click" and be able to stand the rigors of play without adverse physical effect.

The characteristics of the wound ball may be controlled by suitable selection and control of the core, the winding tension and the cover. The manufacture of wound balls is, however, relatively expensive involving the fabrication of the core and the precise winding of the thread on the core by means of winding machinery which have limited capacity, the fabrication of the cover, and the application of the cover to the winding. The most expensive premium balls are generally so constructed that they have the highest initial velocity approaching the 255 feet per second limit. For this purpose, however, a very thin cover must be used due to its relatively lesser resilience and the same is very prone to cutting, when hit with the edge of a golf club which may render the ball no longer usable. Even the thicker covers on the sub-premium balls are prone to cutting and damage and are often rendered unsatisfactory for further use due to such cutting or damage.

Throughout the evolution of the golf ball, there have been many attempts and suggestions to produce golf balls by molding as, for example, from elastomers, such as vulcanized rubber. These attempts and suggestions have included completely molded balls and balls having molded interiors and provided with a separate cover. While it can readily be appreciated that a molded golf ball could be produced much more cheaply than a wound golf ball and could eliminate many of the disadvantages of a wound ball, nevertheless, in spite of constant and continual efforts to produce a satisfactory molded ball, none have been successfully produced, and the only acceptable balls available are the wound type.

It has never been proven feasible, nor possible to mold a golf ball from an elastomer which would have the required characteristics as set forth above. Ordinary elastomers, such as rubber or the like, even when vulcanized do not have the characteristics to allow the production of a ball with sufficient hardness, compression, click, and the like. If it is attempted to increase the degree of hardness by increasing the cross-link density, caused by the vulcanization, as for example, with sulfur, the structure becomes too brittle and too inflexible and this cannot be remedied by the use of plasticizers, etc. Furthermore, in order to obtain the desired density, thick fillers and additives have to be used and all in all, it was simply not possible to obtain a ball of the required density which would still have the other necessary characteristics for a successful golf ball.

SUMMARY OF INVENTION

In accordance with the invention, I have surprisingly discovered that if an elastomer is cured in the presence of a relatively large amount of a monomer which is capable of acting as a cross-linking agent for the elastomer and under conditions which will additionally result in the polymerization of the monomer, a structure is formed which consists of the elastomer cross-linked into a three dimensional network with a high density of long, flexible cross-links and that this structure is capable of being produced in the form of a molded golf ball having all of the required golf ball characteristics and yet overcoming the disadvantages of the wound balls.

For the production of the homogeneous molded golf balls in accordance with the invention, the elastomer is cured while being molded under heat and pressure in the form of the golf ball in the presence of the monomer, a material promoting polymerization of the monomer, as for examlpe a free radical type polymerization initiator, such as a peroxide catalyst and preferably a filler in order to adjust the ultimate density to the desired value.

As monomers which are capable of acting as cross-linking agents for elastomers will generally polymerize or cure per se into a hard, brittle form, it was completely unexpected that the curing of the monomer within the elastomer would result in a material having the necessary toughness, resilience, etc. for forming a satisfactory molded golf ball.

The elastomer is molded into the form of the golf ball, in intimate mixture with the monomer, and preferably a filler material, in the presence of a polymerization initiator for the monomer and under sufficient heat and pressure to cure the composition.

DESCRIPTION OF PREFERRED EMBODIMENTS

The elastomer may be any elastomer which is capable of being cross-linked and is preferably a rubber such as a polymer, copolymer, or terpolymer of butadiene, isoprene, or chloroprene. Most preferably the elastomer is a cis-butadiene rubber containing at least 40% cis. Examples of other elastomers include chlorinated and sulfochlorinated polyethylenes, amorphous polyolefins, such as polyethylene and polypropylene copolymers and terpolymers with unsaturated monomers;

silicone rubbers; polypropylene oxide elastomers; butyl rubber; polysulfides; acetaldehyde copolymers; urethane elastomers; ethyl-vinyl acetate copolymers; styrene copolymers with acrylic and methacrylic esters of alcohols containing at least four carbon atoms, and the like. The elastomers should initially have a sufficient molecular weight to constitute a solid or at least viscous liquid.

The monomer may be any monomer which is capable of cross-linking the elastomer and undergoing further polymerization. In order to serve as cross-linking agents, the monomers generally must be in the form of difunctional compounds, i.e., compounds having two readily polymerizing groups or sites. The term "monomer" as used herein is used in its broadest sense and is not restricted to monomeric units but includes partial polymers capable of further polymerization. Examples of these monomers which are referred to herein and in the claims as cross-linking monomers, include: vinyl, allyl, methallyl, furfuryl, crotyl and cinnamyl esters of the following acids: oxalic, malonic, succinic, glutaric, adipic, pimelic, suberic, azelaic, sebacic, maleic, itaconic, citraconic, mesaconic, furmaric, aconitic, phthalic, isophthalic, terephthalic, naphthalene dicarboxylic, mellitic, pyromellitic, trimesic, acrylic, methacrylic, cennamic, and crotonic. Also are polyamine amides and imides of the following acids: maleic, itaconic, acrcylic, methacrylic, crotonic, citaconic, aconitic and cinnamic, polyol esters and anhydrides of acrylic methacrylic, crotonic and cinnamic acids. Other materials include di- and triallyl cynaurate; di- and triallylmelamino; divinyl benzene; diallyl benzene; diallyl amine, allyl ether; allyl glycolates; di-, tri and tetravinyl and allyl silanes. Still further suitable materials are low molecular weight reactive polymers such as polymers of butadiene, isoprene, chloroprene and epoxidized derivatives of these materials. The diacrylates and dimethacrylates, as for example butylene glycol dimethacrylate, have proven peferrable though divinyl compounds, such as divinyl benzene have also proven highly suitable.

In order to vary the density so that the finished ball will have the desired weight and will not exceed the maximum allowable weight, a filler may be required which may also serve to reinforce the composition. Any known or conventional filler may be used which should be in finely divided form, as for example in a form between about +20 and −325, and preferably +60 and −325 mesh U.S. Standard screen size. Most preferably the filler material is in the form of a silica or silicate as fillers in this form actually act as an adjunct to the cross-linking and thus aid the same and become a more integral part of the composition additionally and a minor amount of cork should preferably be used. In addition to the silica and silicate fillers, such as finely divided porous $SiO_2$, alkali metal silicates, such as calcium silicate, and the like, and other fillers in addition or in place of the silica, or silicates, such as carbon black, cork, titania, cotton flock, cellulose flock, leather fibre, plastic fibre, plastic flour, leather flour, fibrous fillers, such as asbestos, glass, and synthetic fibers, metal oxides, carbonates, and talc can be used.

The polymerization initiator may be any known or conventional initiator capable of causing the cross-linking monomer to further polymerize and cross-link. Generally, these initiators are of the free radical type, such as a peroxide, persulfate, azo compounds hydrozines, amine oxides, ionizing radiation, and the like. Peroxides, such as dicumyl peroxide and other commercially available peroxides conventionally used as polymerization catalysts may be most conveniently used.

The amount of the cross-linking monomer must be at least 25% by weight of the elastomer in order to obtain the necessary degree of cross-linking to form the required three-dimensional molecular network and to give the ball its characteristics. Amounts of the cross-linking polymer, as high as 90% by weight of the elastomer, may be used but amounts between about 40 and 75% by weight of the elastomer are preferred.

The amount of the filler material is dictated by its type and the type of the other constituents in order to obtain the required density and may vary between about 20 and 90% by weight of the elastomer, and preferably 30 and 70% of the elastomer.

The polymerization initiator need only be present in the catalytic amount required for this function and may be in general used in the amounts that the particular agent is generally used as a polymerization catalyst. In connection with peroxides, the same, for example, may be used in amounts of about 0.2–10% by weight of the elastomer.

When using the preferred components, the best results are obtained with compositions having 100 parts by weight of the cis-butadiene rubber and approximately 40–70 parts by weight of the methacrylate ester and 20–60 parts by weight fillers.

For the production of the golf balls, the ingredients should initially be intimately mixed using, for example, the usual rubber mixing rolls or a Banbury mixer until the composition is reasonably uniform. The mixing is basically done in a manner which is common in the elastomer art and there is practically no danger of overmixing. The temperature of the mixing is not critical but should, of course, be below curing temperature, and the same is generally effected at room temperature, though through friction the ingredients may be slightly warmed. This again follows rubber milling practice and involves no new technique, the heating up being relatively low.

The molding is effected in mating precision hemisphere molds or dies whose molding surface is covered with multiple regular projections to give the molded ball conventional dimpled or waffled surface appearance in order to improve its aero-dynamic characteristics. The molding is a simple, straight-forward operation effected in the conventional manner used in precision molding. The material, after being thoroughly mixed may be formed into slugs in the customary manner and the slugs which may be cylindrical or any other desired shape which will facilitate the insertion in the mold should be proportioned so that the mold is fully filled. The mating halves of the mold are then closed so that the mold cavity is entirely filled. The mold halves may be held together with pressures between about 100 and 3,000 p.s.i. preferably 1,000 to 2,000 p.s.i. The actual pressure actually exerted on the material being molded during the molding is probably between about 50 and 1,000 and preferably 100 and 500 p.s.i. Molding temperatures may vary depending on the particular composition used and may, for example, vary between 200–400° F. When utilizing the preferred compositions, the temperature preferably should not be below about 290° F. Optimum results are obtained in the neighborhood of 300° F. with a molding time of about 10 minutes. The molding should be effected until the composition is substantially completely cured, and there is no real upper limitation on the length of the curing time except as is dictated by practical considerations. In general, curing times between about 1 and 60 minutes, and preferably 4 and 30 minutes will generally suffice. Higher temperatures may be used up to about 400° F., but a problem arises. For optimum properties, the molded ball must be homogeneously cured, that is to say the heat must have reached the center of the ball before the outside layers become completely cured. With a cold mold, this presents no problem and temperatures may reach an end point as high as 400° F. However, normally in successive molding operations the mold is warm or hot when the next batch is molded, and in such cases, there is a tendency to over-cure the outer layers before the center of the ball is satisfactorily cured. As a practical matter, therefore, it is very difficult to mold optimum balls at temperatures above 320° F. Since, however, there is no advantage in high temperatures, it is preferred to operate at or near 300° F. with a molding time of approximately 10 minutes at this temperature. The time is not critical but nothing is gained in longer times after the curing is complete.

After the molding, the balls are removed from the mold and any mold mark where the molds mate may be removed, as for example, by buffing, and the ball painted and marked, is then ready for marketing and use. Painting may be effected in the conventional manner using the conventional paints used for golf balls, as for example, enamel, polyurethane, epoxy, acrylic, or vinyl paints.

The size of the mold should be such that the finished balls have a diameter greater than 1.680" and is preferably between 1.680 and 1.685" in diameter. With this size the weight of the ball may be controlled so that it is less than 1.620 ounces and preferably between 1.600 and 1.620 ounces. The ball may be molded and will retain a roundness within .01" and preferably within .001". The density of the painted ball will be less than 1.13 and will be preferably between 1.11 and 1.12. The hardness of the ball as measured on a Shore hardness test will be greater than 75$b$ and less than 99$c$, and will preferably be between 90–100$b$. The compression, as measured on a standard golf ball compression test machine will be between 40 and 150 points and preferably between 70 and 120 points. The balls will preferably bounce between about 60 and 75% of the height from which they are dropped in accordance with the Standard Bounce test.

The initial velocity of the balls, as tested on a standard U.S.G.A. test machine will be between 200 feet per second and 255 feet per second and preferably between about 230 and 250 feet per second. In actual play, however, due to internal dampening, the balls will appear livelier and may be driven further than conventionally wound balls which show a similar initial velocity.

The balls have all the desirable play characteristics of the best conventionally wound balls, have good click, excellent feel, and as contrasted to the covered wound balls, are so highly resistant to cutting that the same may practically be considered cut-proof, and indestructible in play. Furthermore, the balls will have a perfect center of gravity, excellent aero-dynamic properties, superior roll, and even when severely distorted will return to round.

As contrasted to the conventionally covered wound balls, balls in accordance with the invention may be marked by simply stamping with a flat die, and are heat-resistant, solvent-resistant, abrasive-resistant, have an excellent shelf-life, will not water-log and have a superior texture and appearance. If the paint on the ball becomes worn or damaged, the balls may be very readily reclaimed by removing the old paint cover with grit-blasting, such as sand-blasting and repainting the same. In contrast thereto, the conventional balls seldom last long enough to allow repainting.

The golf balls in accordance with the invention may be manufactured much more easily and cheaply than the conventional wound balls, and the required raw materials are readily available and relatively inexpensive.

Critical for the desired characteristics is the combination of the elastomer with the relatively large amount of the cross-linking monomer which polymerizes as it cross-links the elastomer forming the three-dimensional network with the long, flexible cross-links. The combination of the elastomer with this monomer produces a synergistic effect since it yields a tough impact-resistant material having the desired and necessary characteristics, whereas either of these materials cured alone will not produce such a material.

The long, flexible cross-links thus formed will generally have a length of at least 10 carbon atoms and normally the length of the cross-links will be substantially in excess of this. Thus, for example, when using butylene-1,3-dimethacrylate a cross-link of 11 atoms minium length is obtained, and the average length is a multiple of this value.

In addition to the molding of golf balls, the molding composition, namely the combination of the diene elastomer and the cross-linking monomer which polymerizes as it cross-links the elastomer forming the three-dimensional network with long, flexible cross-links, may be used for molding any other bodies or objects where tough, impact-resistant characteristics are desired.

The following examples are given by way of illustration and not limitation:

EXAMPLE I

A composition of 100 parts of predominantly cis butadiene polymer, 62.5 parts of butyleneglycol dimethacrylate, 62.5 parts of a fine silica filler sold under the trade name of "Hysil," and 3.13 parts of dicumyl peroxide, are thoroughly mixed on rubber rolls at approximately room temperature until the resulting material is completely homogeneous. The material is made up into cylindrical slugs of suitable weight, for example, by extruding and cutting, which are filled into molds on a multiple molding press. Molding is effected at pressures from 125 to 300 p.s.i. at a mold temperature of 300° F. with a molding time of about 10 minutes.

The balls are removed from the mold, the thin fin or flash from the mold is buffed off, and the ball is then painted and marked.

The balls have the following characteristics:

Size.—1.680" in diameter
Roundness.—.002
Hardness.—96$b$
Compression.—125
Initial velocity.—238±2

Their play characteristics may be considered at least equivalent to the conventional premium-quality wound balls, and they have excellent click and other playing characteristics. The balls are practically cut-free and indestructible and their resistance to extreme stresses is shown by clamping the ball and a premium-wound ball in a vise and applying pressure until the wound ball explodes and removing the molded golf ball. It is slightly out of shape but in a few moments resumes its normal round shape.

EXAMPLE 2

A composition of 100 parts of cis butadiene, 62.5 parts of divinyl benzene, 62.5 parts of fine silica of a particle size between .01 and 0.1 micron and 3.13 parts of dicumyl peroxide, are thoroughly mixed on rubber rolls at approximately room temperature until the composition is completely homogeneous. The material is made up into cylindrical slugs and placed in molds. Molding is effected at pressures from 125 to 130 p.s.i. at a mold temperature of 300° F. with a molding time of about 10 minutes. The balls are removed from the mold, the thin fin is buffed off and the balls are then painted white. The golf balls produced were of excellent quality, having the following characteristics:

Size.—1.681" in diameter
Weight.—1.610 oz.
Roundness.—.002"
Density.—1.12
Hardness.—94$b$
Compression.—103
Initial velocity.—238±2

EXAMPLE 3

A composition of 100 parts by weights of cis polybutadiene, 56.2 parts by weight of butylene glycol dimethacrylate, 37.5 parts by weight of fine silica sold under the trade name "Hysil," 6.2 parts by weight of cork having a particle size below 60 mesh, and 3.13 parts by weight of dicumyl peroxide, are thoroughly mixed on rubber rolls at approximately room temperature until the resulting mixture is homogeneous. The material is made up into cylindrical slugs and molded, in the identical manner described in Example 1, into golf balls. The balls produced have the following characteristics:

Size.—1.680" in diameter
Weight.—1.58 oz.
Compression.—85
Hardness: 93b
Initial velocity.—238±2

If the balls are made up in the identical manner except, however, using 12.5 parts of the cork, then the compression increases to 95 and the hardness to 95b.

EXAMPLE 4

The examples may be repeated using cis polyisoprene, SBR rubber, butadiene-acrylonitrile copolymer, butyl rubber, ethylene-propylene-diene terpolymer, in place of the cis butadiene; divinyl adipate, methylene-bis-acrylamide, dialkyl phthalate, ethylene glycol-diacrylate, divinyl terephthalate in place of the polybutylene glycol dimethacrylate or divinyl benzene; calcium silicate, aluminum silicate, calcium carbonate, carbon black in place of the silica; and t-butyl peroxide, cumene hydroperoxide, benzoyl peroxide, perbenzoic acid, azo bis-isobutyronitrile, t-butyl perbenzoate, in place of the dicumyl peroxide, and in each case golf balls of excellent quality, meeting the requirements of the U.S.G.A. will be produced.

I have furthermore discovered that if the procedure described above is followed, but if a white pigment is incorporated in the mixture prior to molding, a golf ball is obtained which is excellently suited for use by golf driving ranges, i.e. practice ranges. The ball is heavier and is generally officially over-weight and is generally not as lively and does not have the initial velocity usually desired by players in ordinary and tournament play. Both these characteristics, however, enhance its desirability for driving range use. Furthermore, and of prime importance, the ball is perfectly white throughout and does not have to be painted. While it does not have as high a gloss as does a painted golf ball, its whiteness is permanent and its appearance is entirely adequate and the elimination of the need for painting further reduces driving range operational costs.

As a white pigment titanium dioxide is preferred but other white pigments, such as barium sulfate, zinc sulfide, barium carbonate, lithopone, titanium with barium base, titanium with calcium base, titanium with aluminum silicate, white lead, calcium carbonate, aluminum oxide may be used.

The amount of the white pigment should be sufficient to give the molded ball the desired white appearance, and in general amounts of 2 to 40%, and preferably 5 to 10% of the total ball should be used.

The white pigment may be used in place of part or all of the filler material, such as the silica or silicate but is most preferably used in addition to a filler, such as the silica or silicate. The ball should preferably contain about 25 to 75% by weight of the elastomer or filler of which 4 to 100% and preferably 12 to 50% is in the form of the white pigments, such as the titanium dioxide.

In all other respects the driving range balls are produced in the identical manner as described for the golf balls above and have the same rugged and durable characteristics.

The following examples are given by way of illustration and not limitation of the driving range golf balls:

EXAMPLE 5

A mixture is prepared with 2.5 pounds of a mixture of 50% cis butadiene and 50% butadiene-styrene copolymer, 8 ounces of the dimethacrylate of Example 1, 4 ounces of titanium dioxide and 8 ounces of the "Hysil" silica filler powder. The amount of dicumyl peroxide curing agent was 2 ounces. When molded, the ball was white with a hardness of about 80b. It is not satisfactory for tournament play, but is a useful ball for driving range use with a good click and a good feel.

EXAMPLE 6

A mixture was made up of 16 ounce parts of cis butadiene polymer, 8.5 ounce parts of butyleneglycol dimethacrylate, 8.5 ounce parts of "Hysil" silica, 1.5 ounce parts of titanium dioxide and 0.5 ounce parts of dicumyl peroxide curing agent. Molding was effected at 300° F. for about 10 minutes under a pressure of 185 p.s.i. A white ball was produced having good bounce and good click, excellently suited for driving range use.

EXAMPLE 7

The procedure of Example 6 was followed, but the amount of titanium dioxide was reduced to 1 part. Molding was at 195 p.s.i. under the same conditions and balls were obtained with good bounce and click, having a hardness of 160 and a compression of 90.

All of the balls made in Examples 5 to 7 were white and could be used for driving range purposes without painting. The balls from all examples exhibit a slight sweetish odor, which to many people is not unpleasant and which is practically unnoticeable with painted balls. However, if it is desired a small amount of an odorant, such as isobornyl acetate can be added.

While the invention has been described in detail with reference to certain specific embodiments, various changes and modifications which fall within the spirit of the invention and scope of the appended claims will become apparent to the skilled artisan. The invention, therefore, is only intended to be limited by the claims or their equivalents wherein I have endeavored to claim all inherent novelty.

I claim:
1. A molding process which comprises forming an intimate mixture of a cis-polybutadiene elastomer about 25 to 90% by weight based on said elastomer of a cross-linking monomer having at least two readily polymerizable sites of the vinyl type, said cross-linking monomer being capable of polymerizing and of cross-linking said elastomer and about 20 to 90% by weight based on said elastomer of a filler at a temperature below the curing temperature of said mixture and molding said mixture into a sphere the size and form of a golf ball in a confined mold cavity under the influence of a free radical initiator at an elevated temperature between about 200 and 400° F. and a pressure of above about 50 p.s.i. until the mixture is substantially completely cured.

2. Process according to claim 1 in which said filler is finely divided silica.

3. Process according to claim 1 in which said cross-linking monomer is a member selected from the group consisting of polyol esters of acrylic and methacrylic acid and polyvinyl aromatic compounds.

4. Process according to claim 3 in which said free radical initiator is a peroxide catalyst and in which said molding is effected at a temperature between about 290 and 320° F.

5. Process according to claim 4 in which said cross-linking monomer is selected from the group consisting of butylene glycol dimethacrylate and divinyl benzene.

6. Process according to claim 4 in which said cross-linking monomer is selected from the group consisting of polyol esters of acrylic and methacrylic acid and polyvinyl aromatic compounds.

7. Process according to claim 1 in which said free radical initiator is a peroxide catalyst.

References Cited

UNITED STATES PATENTS

| | | | |
|---|---|---|---|
| 3,022,208 | 2/1962 | Vanderbilt | 260—41.5 |
| 3,084,115 | 4/1963 | Smith et al. | 260—879 |
| 3,313,545 | 4/1967 | Bartsch | 260—41.5 |

FOREIGN PATENTS 875,424   8/1961   Great Britain.

ALLAN LIEBERMAN, *Primary Examiner.*

U.S. Cl. X.R.

260—879, 880; 273—218; 264—331

U.S. DEPARTMENT OF COMMERCE

PATENT OFFICE

Washington, D.C. 20231

UNITED STATES PATENT OFFICE
CERTIFICATE OF CORRECTION

Patent No. 3,438,933                                                                April 15, 1969

James R. Bartsch

It is certified that error appears in the above identified patent and that said Letters Patent are hereby corrected as shown below:

In the heading to the printed specification, line 5, "New Jersey" should read -- Delaware --; line 7, "S.N. 252,058" should read -- S.N. 252,588 --. Column 3, line 25, "Also are" should read -- Also suitable are --; line 28, "acrylic methacrylic" should read -- acrylic, methacrylic --; line 29, "Other materials" should read -- Other suitable materials --; line 30, "cynaurate" should read -- cyanurate --. Column 8, line 26, "160" should read -- 100 --; line 38, "artisin" should read -- artisan --.

Signed and sealed this 7th day of April 1970.

(SEAL)

Attest:

Edward M. Fletcher, Jr.                         WILLIAM E. SCHUYLER, JR

Attesting Officer                                    Commissioner of Patents